(12) United States Patent
Miyatake et al.

(10) Patent No.: US 7,529,383 B2
(45) Date of Patent: May 5, 2009

(54) IMAGE INPUT APPARATUS

(75) Inventors: Shigehiro Miyatake, Osaka (JP); Jun Tanida, Kobe (JP); Kenji Yamada, Kawachinagano (JP)

(73) Assignee: Konica Minolta Holdings, Inc., Tokyo (JP)

( * ) Notice: Subject to any disclaimer, the term of this patent is extended or adjusted under 35 U.S.C. 154(b) by 612 days.

(21) Appl. No.: 10/532,659

(22) PCT Filed: Oct. 24, 2003

(86) PCT No.: PCT/JP03/13617

§ 371 (c)(1),
(2), (4) Date: Aug. 22, 2005

(87) PCT Pub. No.: WO2004/039071

PCT Pub. Date: May 6, 2004

(65) Prior Publication Data

US 2006/0072029 A1    Apr. 6, 2006

(30) Foreign Application Priority Data

Oct. 25, 2002    (JP) .............................. 2002-310375

(51) Int. Cl.
*G06K 9/00* (2006.01)
*H04N 5/225* (2006.01)
*C09K 19/52* (2006.01)
*H01L 37/00* (2006.01)

(52) U.S. Cl. ...................... 382/100; 382/101; 382/115; 382/116; 382/232; 348/335; 348/340; 349/5; 349/95; 250/208.1; 250/216; 250/226

(58) Field of Classification Search ................ 382/100, 382/101, 115, 116, 276; 348/335, 340, 219.1; 250/208.1; 359/569; 349/5, 95; 428/1.1
See application file for complete search history.

(56) References Cited

U.S. PATENT DOCUMENTS 6,233,035 B1 *    5/2001    Toshiyuki et al. ............. 355/22
6,765,617 B1 *    7/2004    Tangen et al. ............... 348/340

(Continued)

FOREIGN PATENT DOCUMENTS

EP    0 840 502 A2    5/1998

(Continued)

*Primary Examiner*—Jingge Wu
*Assistant Examiner*—Nancy Bitar
(74) *Attorney, Agent, or Firm*—Darby & Darby P.C.

(57) ABSTRACT

An image input apparatus which reconfigures a single reconfigured image from a plurality of low-resolution, object reduced images formed in a specified region on the light detecting element by the micro-lens array, wherein a high-resolution, single reconfigured image can be obtained even if the distance between the subject and the micro-lens array is long (infinitely long, for example), and further a reconfigured image can be realized in colors. The image input apparatus is characterized in that the relative distance between a micro-lens (1a) and light detecting cells (3a) in a specified region, where object reduced images corresponding to the micro-lens (1a) are formed, is different in each micro-lenses (1a). In addition, the light detecting cells (3a) are divided into a plurality of regions, and color filters (primary color filter, or complementary color filter, for example) are disposed in each of the divided regions.

4 Claims, 13 Drawing Sheets

U.S. PATENT DOCUMENTS

| | | | |
|---|---|---|---|
| 6,987,258 B2 * | 1/2006 | Mates | 250/208.1 |
| 7,009,652 B1 * | 3/2006 | Tanida et al. | 348/340 |
| 7,157,690 B2 * | 1/2007 | Nishiwaki et al. | 250/226 |
| 7,262,799 B2 * | 8/2007 | Suda | 348/280 |
| 7,351,951 B2 * | 4/2008 | Van Arendonk | 250/239 |
| 2003/0086013 A1 * | 5/2003 | Aratani | 348/335 |
| 2007/0097512 A1 * | 5/2007 | Toyoda et al. | 359/626 |

FOREIGN PATENT DOCUMENTS

| | | |
|---|---|---|
| EP | 1 079 613 A2 | 2/2001 |
| EP | 1 031 239 B1 | 10/2004 |
| JP | 63-232780 A1 | 9/1988 |
| JP | 04-345264 A1 | 12/1992 |
| JP | 10-145802 A1 | 5/1998 |
| JP | 2000-032354 A1 | 1/2000 |
| JP | 2001-61109 A1 | 3/2001 |
| JP | 2001-523929 A1 | 11/2001 |
| JP | 2003-163938 A1 | 6/2003 |
| JP | 2003-283932 A | 10/2003 |

* cited by examiner

IMAGE INPUT APPARATUS

CROSS REFERENCE TO PRIOR APPLICATION

This is a U.S. national phase application under 35 U.S.C. §371 of International Patent Application No. PCT/JP2003/013617, filed Oct. 24, 2003, and claims benefit of Japanase Patent Application No. 2002-310375, filed Oct. 25, 2002 which is incorporated by reference herein. The International Application was published in Japanese on May 6, 2004 as WO 2004/039071 A1 under PCT Article 21(2).

BACKGROUND OF THE INVENTION

1. Field of the Invention

The present invention relates to an image input apparatus which can reconfigure a single, high-resolution object image from a plurality of low-resolution, object reduced images obtained by a plurality of micro-lens, wherein a high-resolution image of the object image can be obtained even if the imaging distance is long (infinitely long, for example), and the object image can be realized in colors.

2. Description of the Related Art

With the arrival of the information society accompanying with the development of the media for communication, image input devices such as digital cameras and video cameras for obtaining the image by a single optical system facing the subject, have already been in use as the image reader which allows effectively obtaining various kinds of high-quality image information.

However, in these days, the image reader imitating the compound-eye found in insects has being developed to meet the requirements of the further downsizing and thinning of the image input apparatus. (e.g. Japanese Patent Publication No. 2001-61109)

The above-mentioned image input apparatus is schematically comprising a micro-lens array having a plurality of micro-lens and planate light detecting elements facing the micro-lens array, wherein a plurality of low-resolution reduced images are focused in the prescribed region on the said light detecting element by the said micro-lens array, and a single object image is reconfigured by signal processing of said reduced object image.

According to the aforesaid mechanism, the image input apparatus, in spite of being small and thin compared with the apparatus comprising a single optical system, realizes bright optical system and even makes obtained (reconfigured) object image (hereinafter referred to as "reconfigured image") as highly fine.

The image input apparatus comprising the said compound-eye mechanism is characterized by imaging the subject from different viewpoints by having parallax between the said micro-lenses. The above-mentioned character (parallax between the micro-lenses) enables object reduced images, which are focused on the prescribed position on the said light detecting element, to form the different images on each micro-lens (images which include different image information), and as a result, a single reconfigured image obtained by rearranging the said object reduced images can be obtained as a highly fine image (contains more image information).

However, in the conventional image input apparatus, when the distance from the subject is long (infinitely long, for example), the parallax between micro-lenses, which is characterized to the said image input apparatus, disappears, and therefore, the difference between object reduced images also disappears (becomes the same). This creates the problem of remarkable decrease of image resolution compared to the case when taking an image of close subject (when there is a parallax between said micro-lenses).

Moreover, the image information obtained by image input apparatus, is preferably recreated by the real colors (colorizing) of the subject. Consequently, as the technology of colorizing the reconfigured image obtained by the image input apparatus comprising the above-mentioned structure, the arrangement of color filters to every micro-lens was suggested, and has been applied for a patent under Japanese Patent Application No. 2001-363117 by the present applicant. However, the technology for colorizing is not limited to the above-mentioned formula, and it is necessary and expected to develop another formula.

Therefore, the present image input apparatus has been invented considering the foregoing conditions, and the first object of this invention is to provide the image input apparatus which can reconfigure a single reconfigured image from a plurality of low-resolution, object reduced images focused on the prescribed region on the said light detecting elements by the micro-lens array, wherein a high-resolution, single reconfigured image of the subject can be obtained even if the distance between the subject and the said micro-lens array is long (infinitely long, for example).

Furthermore, the second object is to provide the new formula, which can realize the colorizing of the reconfigured image.

SUMMARY OF THE INVENTION

In order to achieve the foregoing first object, this invention provides an image input apparatus comprising a micro-lens array where a plurality of micro-lenses are arrayed and the light detecting element facing the said micro-lens array, wherein a single object image can be obtained by rearranging the image information of a plurality of object reduced images focused on the prescribed region on the light detecting element by each of the said micro-lens, and characterized in that the relative position between the said micro-lens and the prescribed region on the light detecting element, on which the object reduced image is focused as corresponding to the said micro-lens, are arranged so as to differ between each of the said micro-lenses.

Here, as the relative position noted above, the construction that can shift the relative position by s/N (s: pitch of light detecting element, N: number of micro-lens unit) sequentially along with the vertical direction and the horizontal direction on the said micro-lens array may be suggested.

According to the said construction, even if the distance between micro-lens and the subject is infinitely long, the object reduced images focused on the light detecting element can be differed at every micro-lenses, furthermore, the resolution of the reconfigured image obtained by the rearrangement of image information of the object reduced images can be increased.

At the same time, if the distance between the said micro-lens and the subject is b, in other words, the magnification for the subject is (m) {m=b/a (a: the distance between micro-lens and light detecting element, b: the distance between micro-lens and the subject)}, the said relative position can be shifted by (s/N−D/m) {s: pitch of light detecting element, N: number of micro-lens unit, D: pitch of micro-lens, m: magnification for the subject achieved by the micro-lens) sequentially along with the vertical direction and the horizontal direction on the said micro-lens array.

According to the foregoing system, since the said relative position is adjusted corresponding to the distance to the subject (i.e. magnification), it is capable of focusing the different object reduced image on the light detecting element consistently, irrespective of the distance to the subject, and moreover, the resolution of the single reconfigured image obtained by the rearrangement of image information of the object reduced images can be increased. More details will hereinafter be described.

Also, when obtaining a single object image by rearranging a plurality of pixel information of the object reduced images formed on the light detecting element by respective micro-lenses, it is preferred that the rearranging position of the object image, on which pixel information of the object reduced images are supposed to be rearranged, is decided on the basis of the said relative position.

Accordingly, the resolution of the said object image can be improved using the difference of the said object reduced images arising from the difference between the said relative positions by fixing the rearranged position of pixel information of the said reduced-images.

At the same time, if the distance between the said micro-lens and the subject is (b), in other words, the magnification for the subject is (m) {m=b/a (a: the distance between micro-lens and light detecting element, b: the distance between micro-lens and the subject)}, the said rearranging position may be fixed to shift by (s/N+D/m) {(s): pitch of light detecting element, (N): number of micro-lens units, (D): pitch of micro-lens, m: magnification of micro-lens for the subject. Besides, m=b/a (a: the distance between the micro-lens and the light detecting element, b: the distance between the micro-lens and the subject)} sequentially along with the vertical direction and the horizontal direction on the said micro-lens array.

In the foregoing construction, as will hereinafter described, it is capable of making the decreasing degree of resolution to the minor even when the distance to the subject changes, and its convenience as an image input apparatus can be improved.

In order to achieve the said second object, this invention comprises a light detecting element containing a plurality of light detecting cells, wherein the said light detecting cell is divided into multiple regions, and at the same time, a color filter is arranged on each of the said divided regions.

Accordingly, it is capable of obtaining the object image in colors from the object reduced images focused on the said light detecting element, thereby realizing the image input apparatus which can obtain more high-quality images. As such construction can be realized from the basis of conventional systems, it is also excellent from the view that the rising of manufacturing cost is controlled to the minimum.

DETAILED DESCRIPTION OF THE PREFERRED EMBODIMENTS

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

Figure 1:
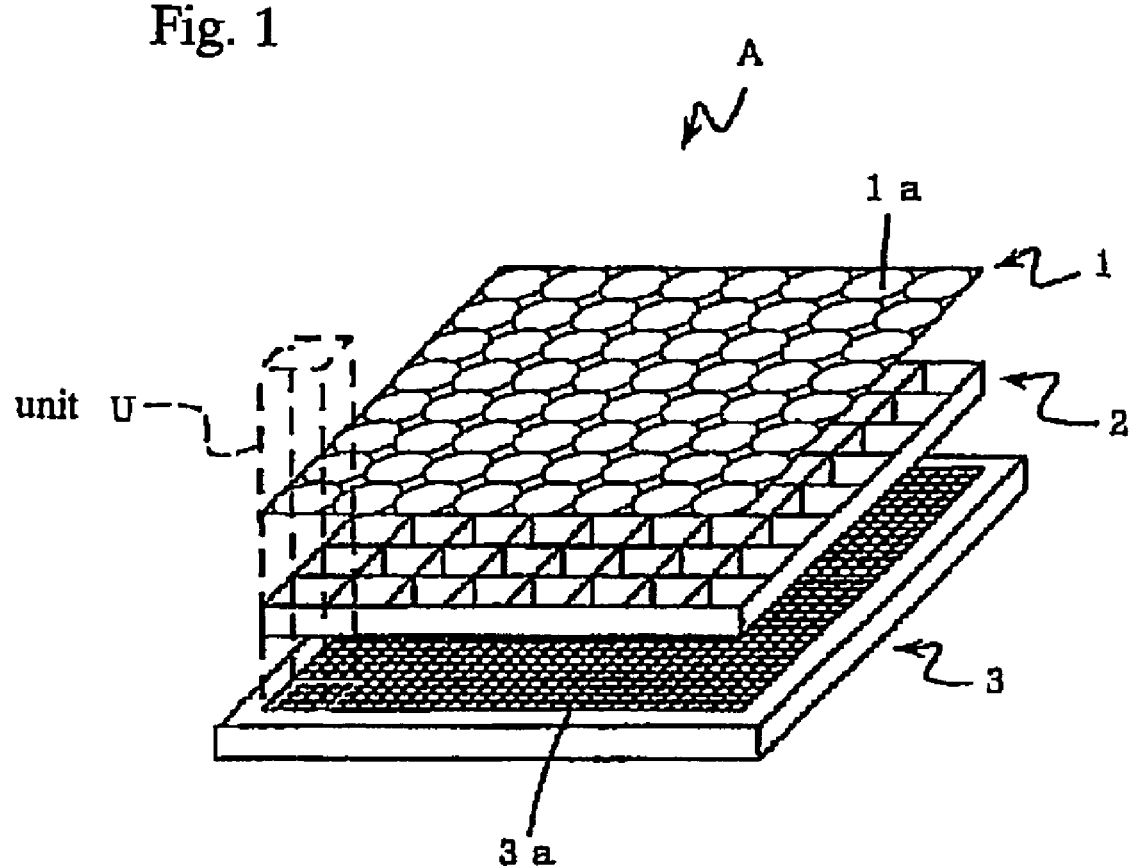
FIG. 1 is a perspective view showing a schematic structure of the image input apparatus (A) according to an embodiment of the present invention.

The image input apparatus according to the embodiments of the present invention is embodied as indicated in FIG. 1.

As shown in FIG. 1, the image input apparatus (A) is comprised of a micro-lens array (1) arraying a plurality of micro-lenses (1a) in a grid-like pattern, a light detecting element (3) forming planimetrically a plurality of light detecting cells (3a), and a grid-shaped partition wall (2) arranged between micro-lens array (1) and light detecting element (3). Here, as indicated by the rectangular column of dotted line in the FIG. 1, micro-lens (1a) forms a signal-processing unit (U), which correspondingly comprises one grid of partition wall (2), as well as a plurality of light detecting cells (3a) included in the rectangular column (prescribed region).

Accordingly, image input apparatus (A) with compound-eye is similar to the conventional image input apparatus in the basic concept of obtaining a single, high-resolution reconfigured image by focusing the object reduced images of the subject in respective unit (U), then reconfiguring the object reduced images.

One example of the specification of image input apparatus (A) is described hereinafter. However, please note that the embodiment of the subject invention should not be limited to the following specification.

Micro-lens array (1)

| | |
|---|---|
| Number of lenses | 10 × 10 |
| Lens pitch | 499 micron × 499 micron |
| Focal length | 1.0 mm |

-continued

| Partition Wall (2) | |
| --- | --- |
| Partition wall pitch | 499 micron |
| Height of the Partition wall | 1.0 mm |
| Thickness of the Partition wall | 39 micron |
| Size of the opening of the Partition wall | 460 micron × 460 micron |
| Light detecting element (3) | |
| Number of pixels | 500 × 500 |
| Size of pixels | 10 × 10 micron |

Figure 2:
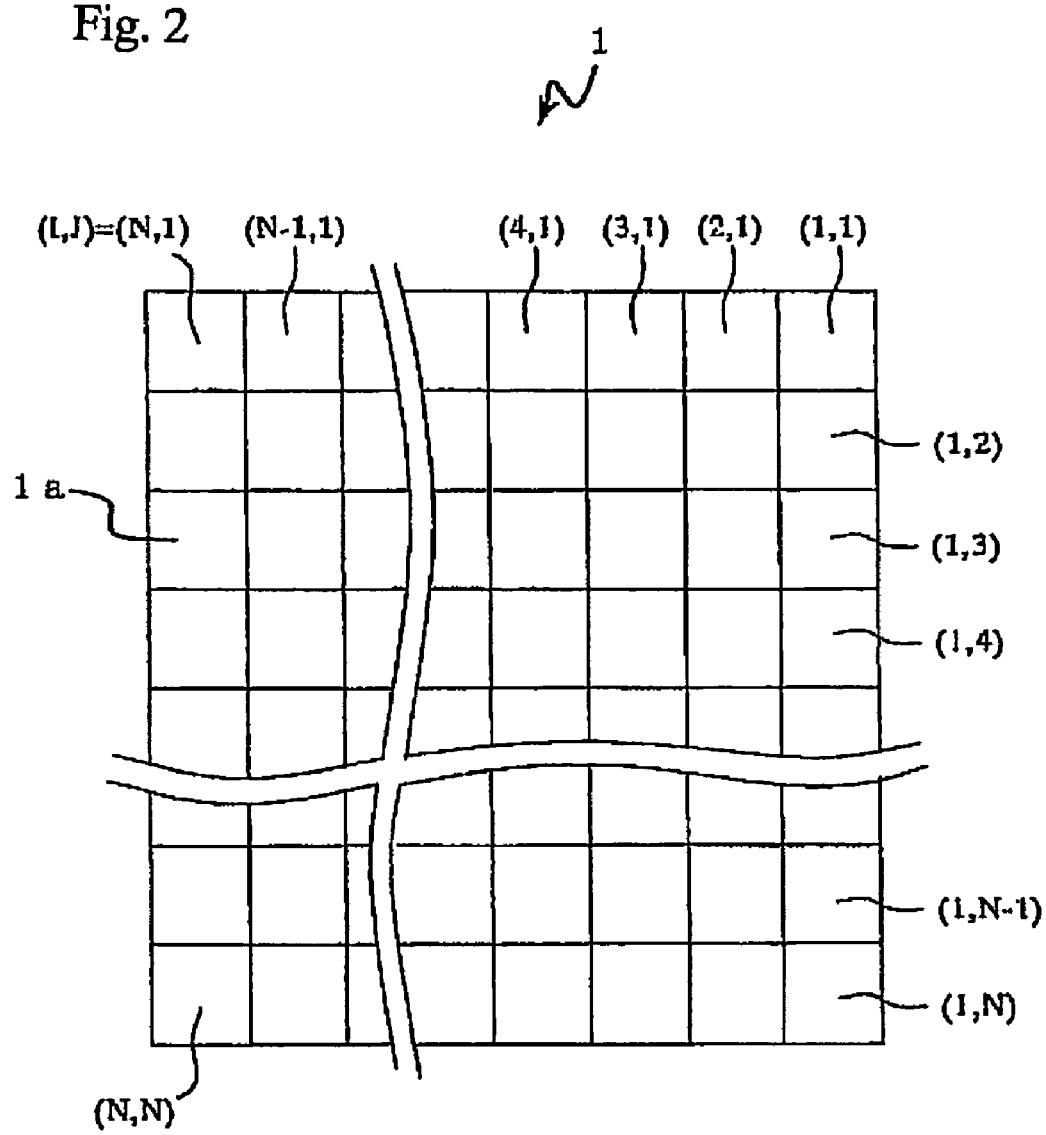
FIG. 2 is a plane view showing the arrangement of micro-lenses array in the image input apparatus (A) according to an embodiment of the present invention.
Figure 3:
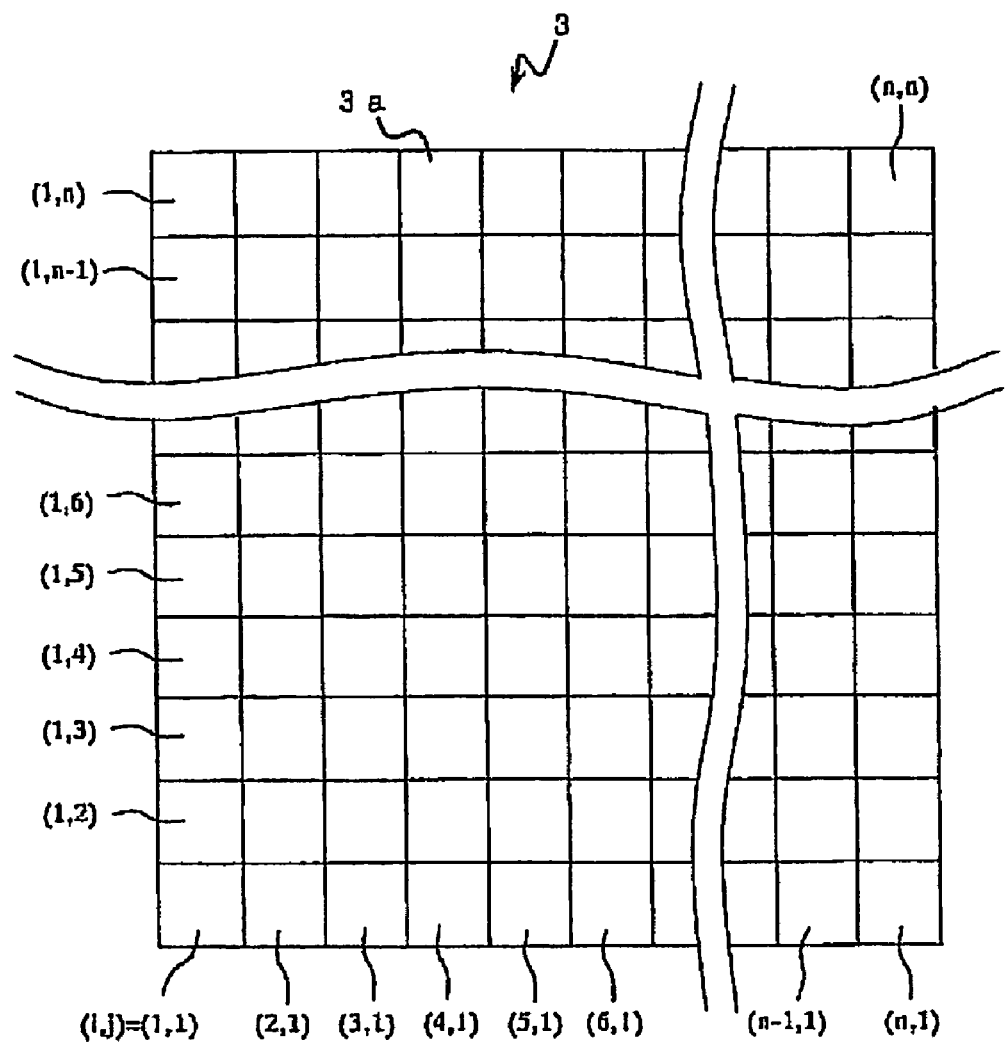
FIG. 3 is a plane view showing the arrangement of light detecting element in the image input apparatus (A) according to an embodiment of the present invention.
Figure 4:
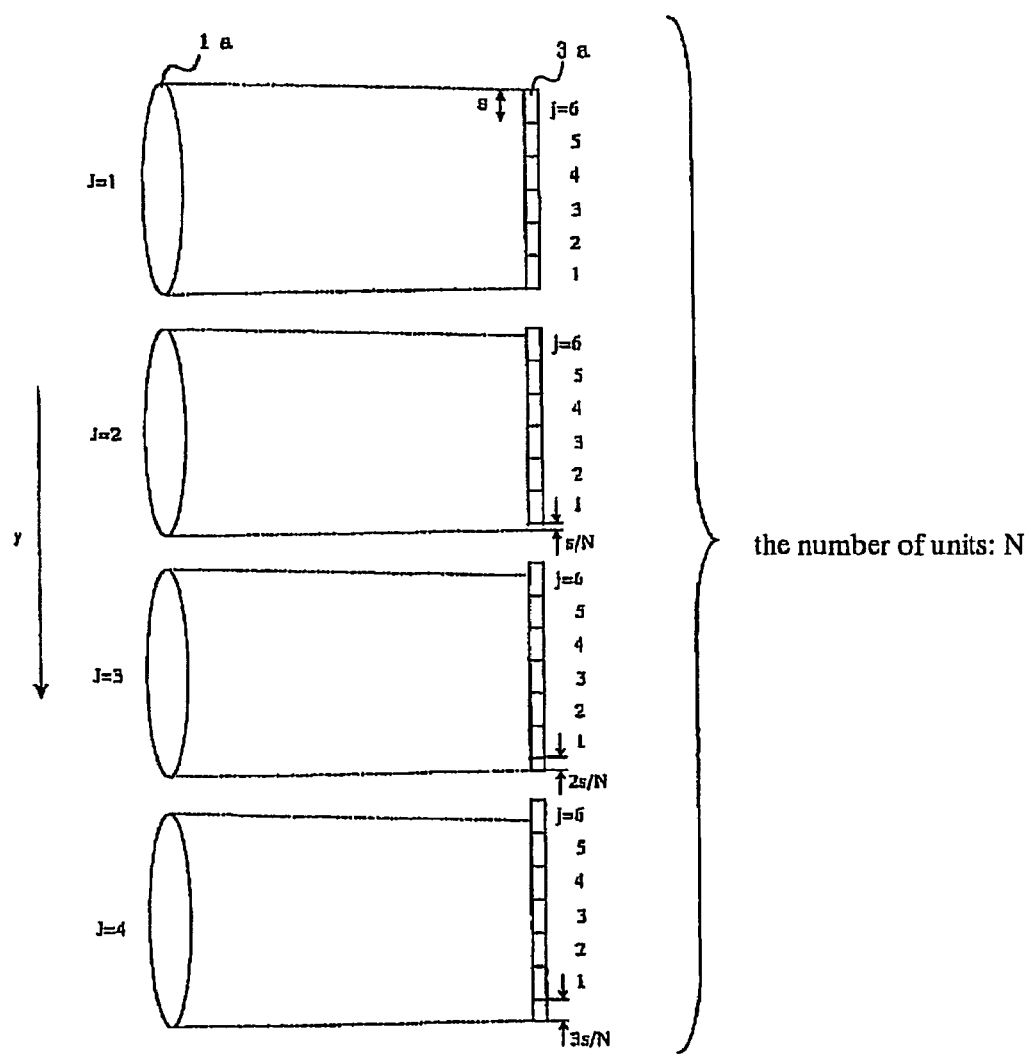
FIG. 4 is a cross-sectional view showing a frame format of a pattern example of positional relationship between the micro-lens array and the light detecting element in the image input apparatus (A) according to an embodiment of the present invention.

With reference to the accompanying drawings FIG. 2 to FIG. 4, as the features of image input apparatus (A), the structure wherein the relative position between micro-lens (1a) and light detecting cells (3a) responding to micro-lenses (1a), is arrayed in the way the said relative position differs for each of micro-lens (1a), as well as the processing for reconfiguring the reconfigured image from image information of the object reduced images focused on light detecting cells (3a), will be explained below.

Here, FIG. 2 is a plane view of micro-lens array (1), and indicates the arrangement example of the whole unit, which comprises (N) number of micro-lenses (1a) in both horizontal and vertical directions.

FIG. 3 is a plane view of light detecting element (3), and indicates the arrangement example where each unit comprises (n) number of light detecting cells (3a) in both horizontal and vertical directions.

FIG. 4 is a cross-sectional view of image input apparatus (A) indicating the frame format of the positional relationship between micro-lens (1a) and light detecting cells (3a), and one example of when the number of units (N)=4 (J=1 to 4) and the number of light detecting cells (n)=6 (j=1 to 6) is indicated. Also, in order to simplify the figure, the FIG. 4 only indicates the vertical direction (indicated in the figure by the arrow "y"), but the same positional relationship exists in the horizontal direction.

As indicated in FIG. 4, the subject embodiment is characterized by arranging the relative position between light detecting cells (3a) and micro-lens (1a) differently in each unit (i.e. micro-lens (1a)). In particular, when the number of units is (N) and the pitch of light detecting cells (3a) is (s), the relative position shift by s/N per unit sequentially in a vertical direction as well as a horizontal direction of micro-lenses (1a) arrangement.

Therefore, it is capable of making the object reduced images focused on light detecting element (3a) different in each unit even when the image of the subject at infinity is taken, furthermore, the resolution of the reconfigured image obtained by the rearrangement of pixel information of the object reduced images can be increased.

As in the above described structure indicated in FIG. 2 to FIG. 4, one example of the procedure for reconfiguring single reconfigured image corresponding to (N)×(n) pixels for both the horizontal and the vertical direction, from (N) number of object reduced images, which are different each other and focused on light detecting cells (3a), is described hereinafter as referring to the FIG. 5.

The procedure of reconfiguration explained below is one example of the applicable procedure in reconfiguring the object image, and the several procedures other than the procedure below are applicable to the subject invention.

(Procedure of Rearrangement)

Here, coordinates of the reconfigured image are presumed to be (x, y), and one coordinate (hereunder, the vertical direction "y") is explained in order to simplify the explanation.

Figure 5:
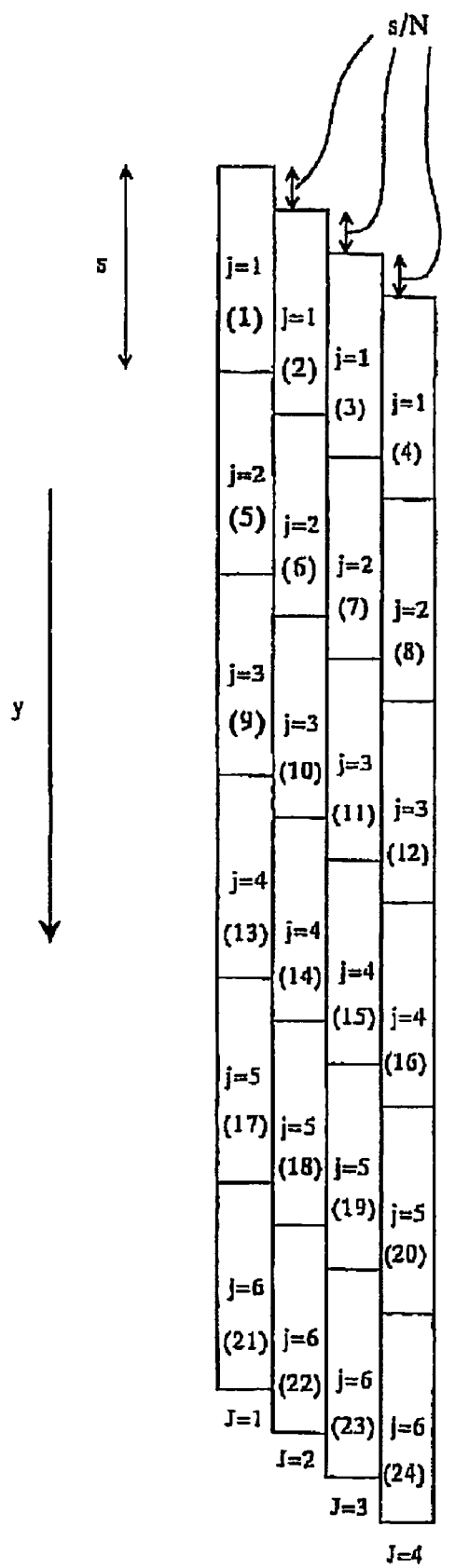
FIG. 5 is a figure showing a frame format of a pattern example of the rearranged (reconstructed) object image.

When the pixel information of y-coordinate in the reconfigured image is presumed to be "reconfigured image y", the followings are rearranged in the "reconfigured image y".

reconfigured image 1: the first signal of pixel in unit 1
reconfigured image 2: the first signal of pixel in unit 2
:
:
reconfigured image N: the first signal of pixel in unit N
reconfigured image N+1: the second signal of pixel in unit 1
reconfigured image N+2: the second signal of pixel in unit 2
:
:
reconfigured image 2N: the second signal of pixel in unit N
reconfigured image 2N+1: the third signal of pixel in unit 1
:
:
reconfigured image 3N: the third signal of pixel in unit N
reconfigured image 3N+1: the fourth signal of pixel in unit 1
:
:
reconfigured image (n−1)×(N)+1: the (n)th signal of pixel in unit 1
:
:
reconfigured image (n)×(N): the (n)th signal of pixel in unit N In accordance with the above-mentioned reconfiguring procedure, FIG. 5 shows an example of reconfigured image rearranged image information (i.e., light detecting cell j=1 to j=6) of the object reduced images of the subject at infinity focused in each units (J=1 to 4) indicated in FIG. 4. The figure shows the case when the size of the reconfigured image is (n)×(s). Also, the number (1) to (24) shown respectively in the light detecting cells are coordinate y of the reconfigured image.

Accordingly, when the subject is at infinity, all microlenses (1a) obtain the same image information, however, slightly different object reduced images are focused on light detecting cells (3a) because light detecting cells (3a) are arranged in relative position shifted by s/N, in accordance with the subject embodiment.

Consequently, when reconfiguring a reconfigured image from object reduced images, it is understandable that a high-resolution reconfigured image can be obtained from a plurality of object reduced images by rearranging light detecting cells (3a) shifted by s/N sequentially in the order of j=1 in J=1 unit, j=1 in J=2 unit . . . as considering the difference of relative position (i.e., as has been described in the reconfiguring procedure).

Next, as referring to FIG. 6, the procedure for reconfiguring a reconfigured image from object reduced images when the subject is not at infinity, and the distance between micro-lens (1a) and the subject is (b) (hereinafter referred to as "imaging distance (b)"), that is, the magnification for the subject is (m) (=b/a) {a: distance between micro-lens (1a) and light detecting cells (3a)} is described.

Figure 6:
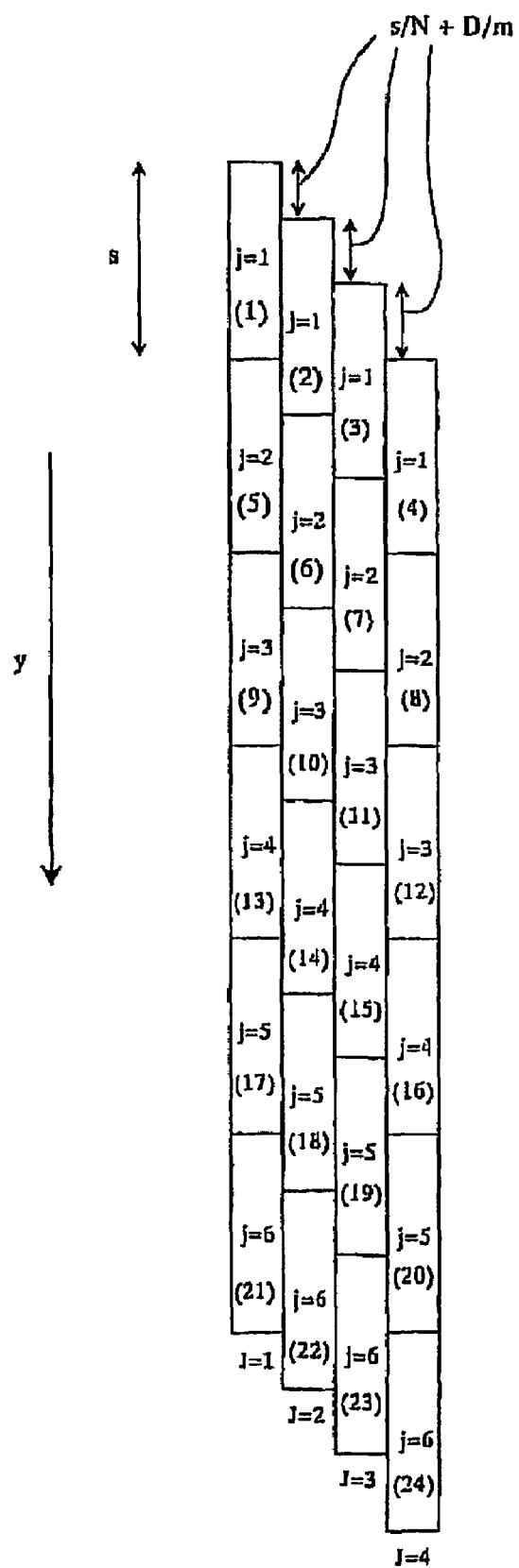
FIG. 6 is a figure showing a frame format of another pattern example of the rearranged (reconstructed) object image.

Here, FIG. 6 shows a frame format of one example of the reconfigured image, when the magnification of the subject for the image is (m) (=b/a), simultaneously where the size of the reconfigured image is (n)×(s).

In this case, light detecting cells (3a) are rearranged having shifting of D/m in addition to the case in FIG. 5, compared with the case when the subject is at infinity (indicated in FIG. 5). However, (D) is a pitch of each unit (D/m<s/N).

The important point here is that pixel information shifted significantly from pitch (s) is outputted by additional D/m shifting of the light detecting cells (3a) (i.e. pixel information). Concretely, it is the pixel information obtained by J=4 unit in FIG. 6. Such pixel information (misaligned more than (s)) becomes redundant, and therefore dose not contribute to the improvement of resolution.

It is preferred in this case to form the reconfigured image as deleting the redundant image information.

Concretely, in case of FIG. 6, the rearrangement can be performed in the order of j=1(1) in J=1 unit, j=1(2) in J=2 unit, j=1(3) in J=3 unit, J=2(5) in J=1 unit, j=2(6) in J=2 unit . . . , though j=1(4) and j=2(8) . . . , in J=4 unit are not used.

In this case, although the resolution becomes lower by the unused light detecting cells (3a) (light detecting cell (3a) in J=4 unit) compared with the resolution in case of focusing the subject at infinite (indicated in FIG. 5, when all pixel information of light detecting cells (3a) are used to reconfigure), the decreasing rate is minor.

Here, as an example of the concrete embodiment, it is explained that the decreasing degree of resolution is minor considering the image input apparatus specified as below.

(One Example of Specification)
Unit pitch (D)=499 micron
Light detecting cell pitch (s)=10 micron
Micro-lens focal distance (f)=1 mm
Number of unit (N)=10
Number of the light detecting cells per 1 unit=46

According to the above specified image input apparatus, it is calculated that magnification m=b/a=b/f−1=999 if the distance toward the image (b) is 1 m. The calculated (m) and the above specifications lead to that D/m=499 micron/999≈0.5 micron, and s/N=1 micron, and therefore D/m+s/N=1.5 micron.

Here, 10÷1.5=6.66 since the pixel pitch (s) is 10 microns, and the data becomes redundant by rearranging light detecting cells (3a), which are in the 3 units out of 10 units, in the position shifted more than pixel pitch (s).

In turn, light detecting cells (3a) in the other 7 units can effect on the resolution of the reconfigured image. Hence, the resolution decreases only about 30 percent when focusing on the subject in short distance.

According to the embodiment, the resolution can be considerably increased for the subject having the distance toward the image (b) long as infinite (as indicated in FIG. 5), and moreover, the degradation of resolution can be minor for the subject in close distance (as indicated in FIG. 6). This invention therefore is more applicable and convenient, compared with conventional systems capable of obtaining merely the reconfigured image in a certain appropriate distance (especially, in flyby distance other than infinite long distance), since being able to provide the image input apparatus which can be used, irrespective of the distance toward the image (b).

Next, another embodiment of the present invention will be described referring to FIG. 7.

In the above-described embodiment, changing (adjusting) the rearranged position where pixel information of light detecting cells (3a) is rearranged according to the imaging distance (b), as well as changing the positional relationship between micro-lens (1a) and the light detecting cell (3a), have been described.

Figure 7:
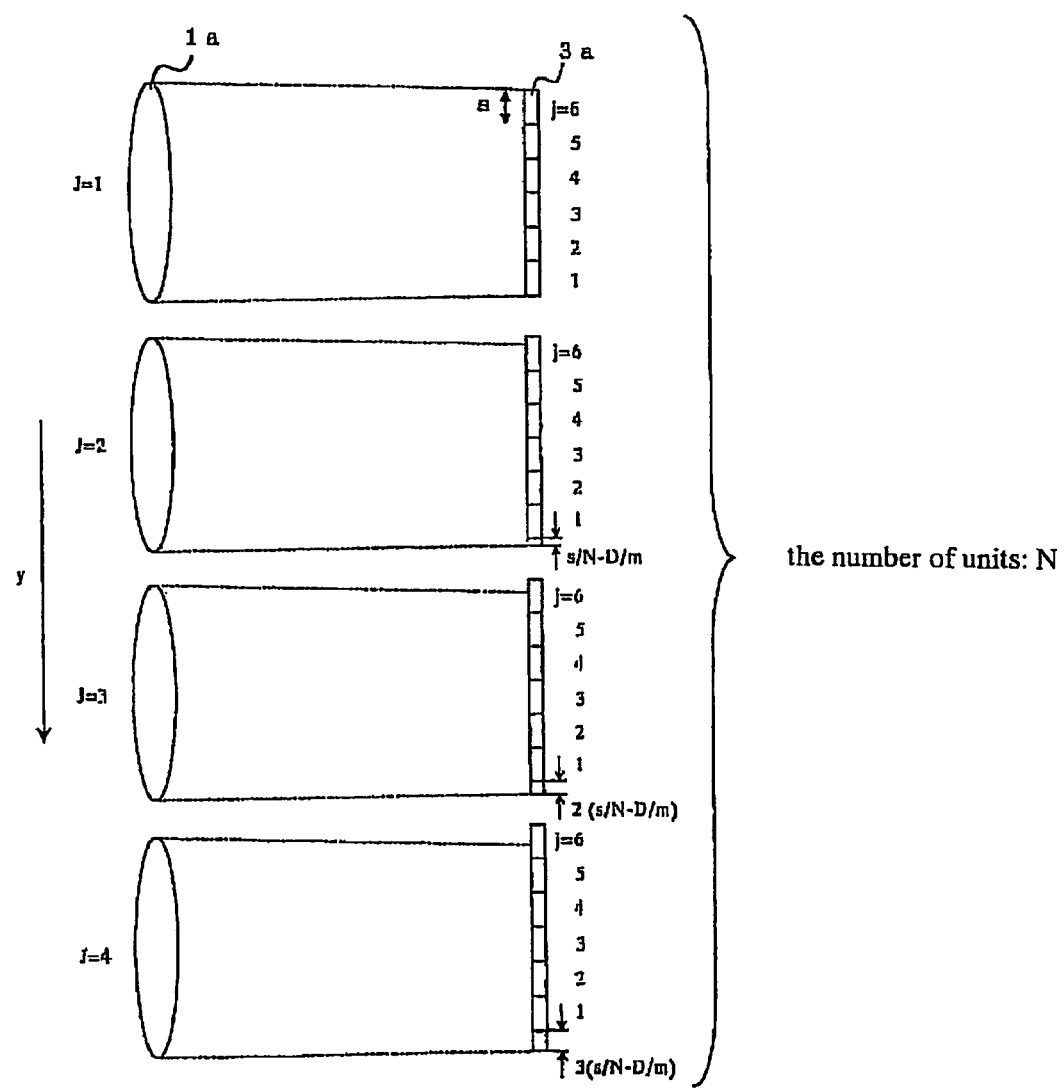
FIG. 7 is a cross-sectional view showing a frame format of another pattern example of positional relationship between the micro-lens array and the light detecting element in the image input apparatus (A) according to an embodiment of the present invention.

Here, the following described embodiment is characterized by that, as shown in FIG. 7, the relative position between micro-lens (1a) and light detecting cells (3a) in each unit is adjustable according to the distance toward the image (b), and adjustment responding to the distance toward the image (b) is not necessary when rearranging light detecting cells (3a).

Concretely, when the pitch of the unit is (D), the number of the unit is (N), and the pitch of the light detecting cell is (s), the relative position between light detecting cells (3a) (j=1 to 6) and micro-lens (1a) shifts by (s/N−D/m) per unit (J=1 to 4) sequentially along with vertical and horizontal directions in the arrangement of micro-lens (1a).

As well as the foregoing, when the distance between the subject and micro-lens (1a) is (b,) the distance between micro-lens (1a) and light detecting cells (3a) is (a), and the focal distance of the micro-lens (1a) is (f), the magnification (m) for the subject image can be also described as (m=b/a=b/f−1).

Figure 8:
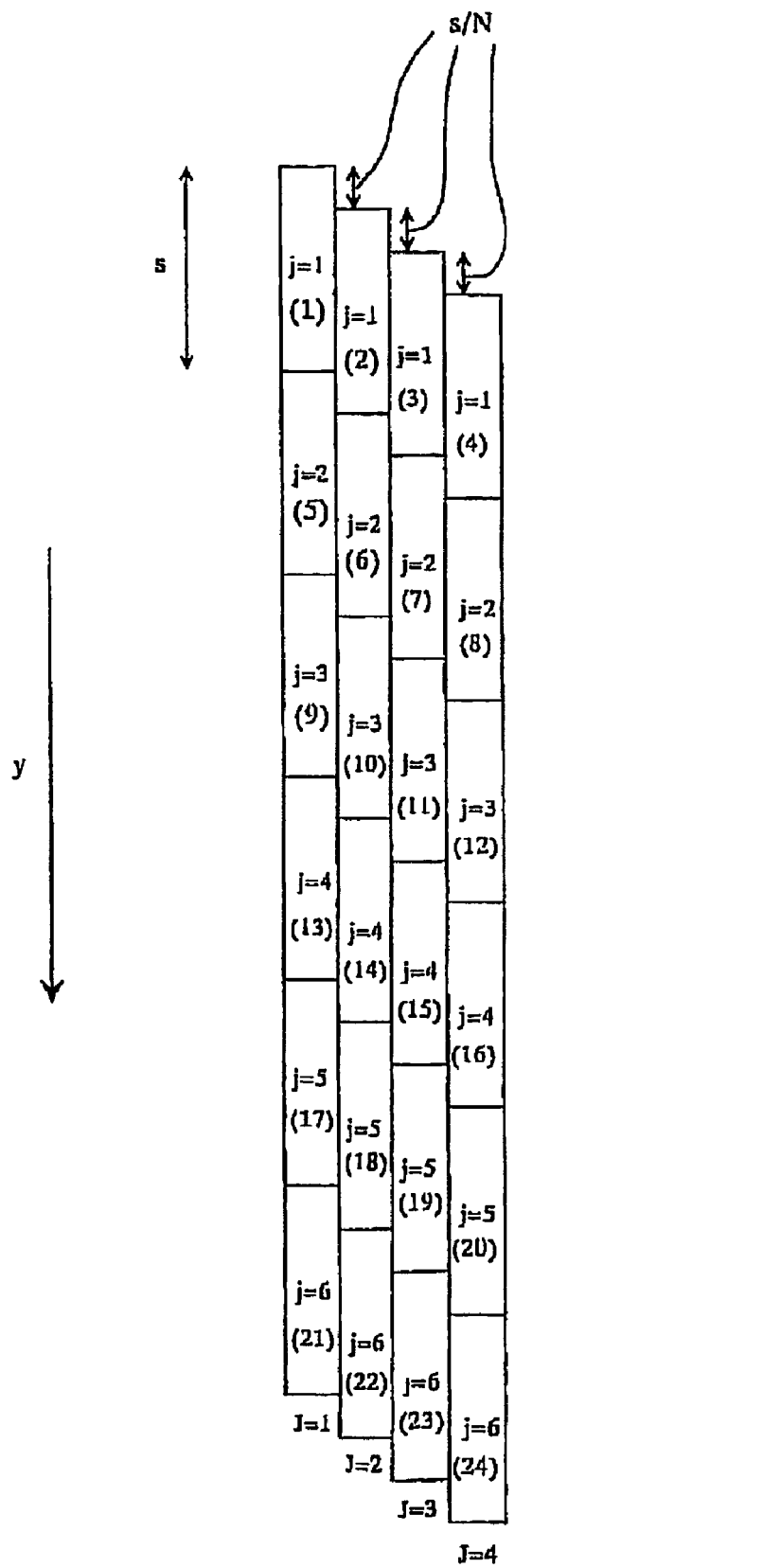
FIG. 8 is a figure showing a frame format of another pattern example of the rearranged (reconstructed) object image.

Here, FIG. 8 is a frame format indicating an example of the reconfigured image rearranging the pixel information (in other words, light detecting cells (j=1 to 6)) of the object reduced images of the subject at infinite taken per unit (U) (J=1 to 4) as shown in FIG. 7. FIG. 8 also indicates a case when the size of the reconfigured image is (n)×(s).

Taking into consideration that each unit (U) has parallax of (D), that the parallax is reduced to (D/m) in light detecting cell, and that light detecting cells (3a) in each unit (U) are arranged sequentially and respectively shifted by (s/N−D/m), it is capable of obtaining a high resolution image by aligning the pixel information sequentially in order j=1 in J=1 unit, j=1 in J=2 unit, . . .

According to the present embodiment, even if the distance toward the image (b) is changed, it is possible to obtain highly fine images only by arranging light detecting cells (3a) in the prescribed order, similar to the case when taking image of the subject at infinite long as shown in FIG. 5, and thereby simplifying the process.

Additionally, as the above explanation and FIG. 8 indicate, this invention is superior over the above embodiment in the feature of constantly obtaining image with highly fine resolution, irrespective of the distance toward the image (b), since the redundant information would not occur even if the distance toward the image (b) is not infinite.

Figure 9:
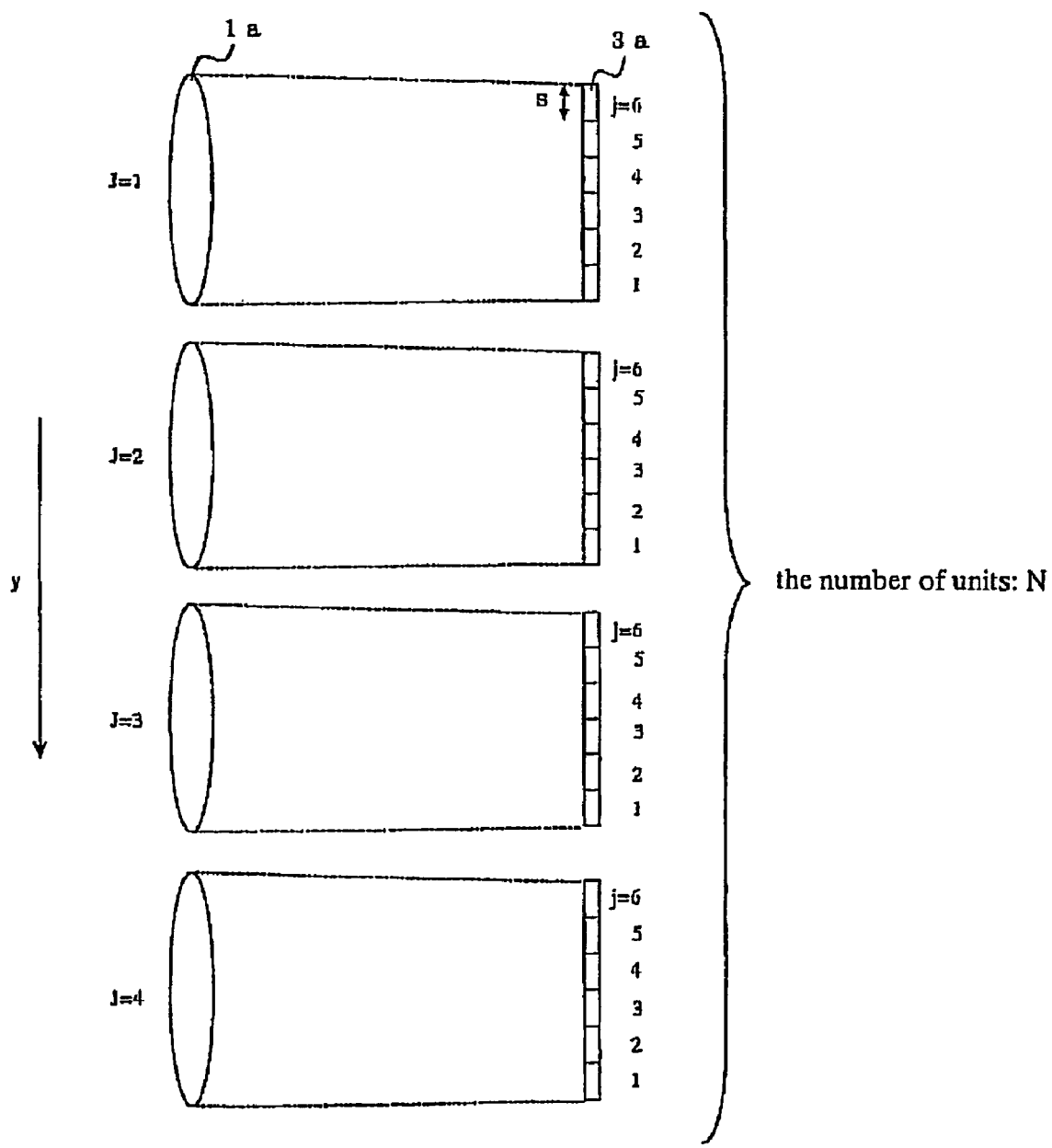
FIG. 9 is a cross-sectional view showing a frame format of another example of positional relationship between the micro-lens array and the light detecting element in the image input apparatus (A) according to an embodiment of the present invention.

Also, since this embodiment has the structure of changing the relative position of micro-lens (1a) and light detecting cells (3a) according to the value (distance) of imaging distance b, s/N=D/m may be applicable depending on the distance toward the image (b). FIG. 9 indicates the positional relationship between micro-lens (1a) and light detecting cells (3a) in each unit (U) when s/N=D/m is applicable. As the figure shows, the relative position between micro-lens (1a) and light detecting element (3) is constant, the same structure of conventional one will be obtained.

Figure 10:
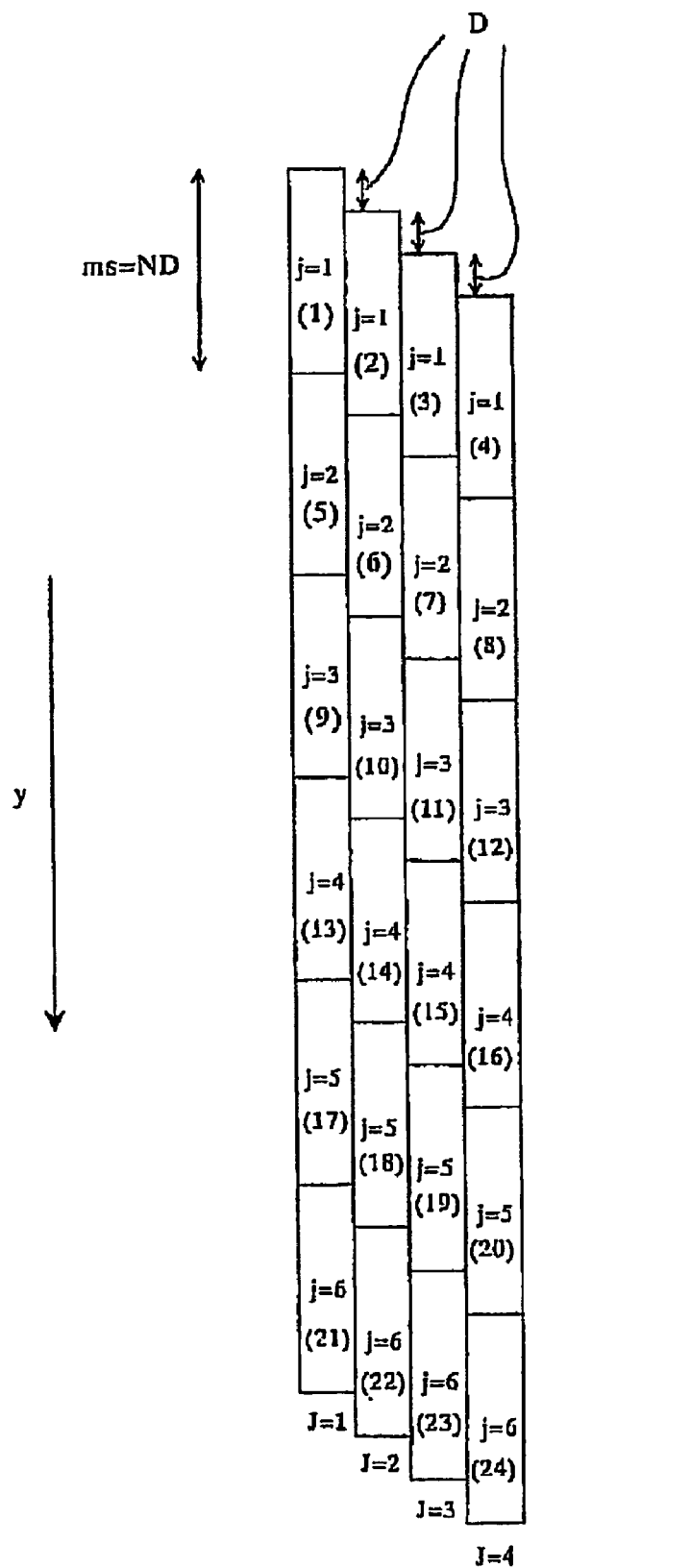
FIG. 10 is a figure showing a frame format of another pattern example of the rearranged (reconstructed) object image.
Figure 11:
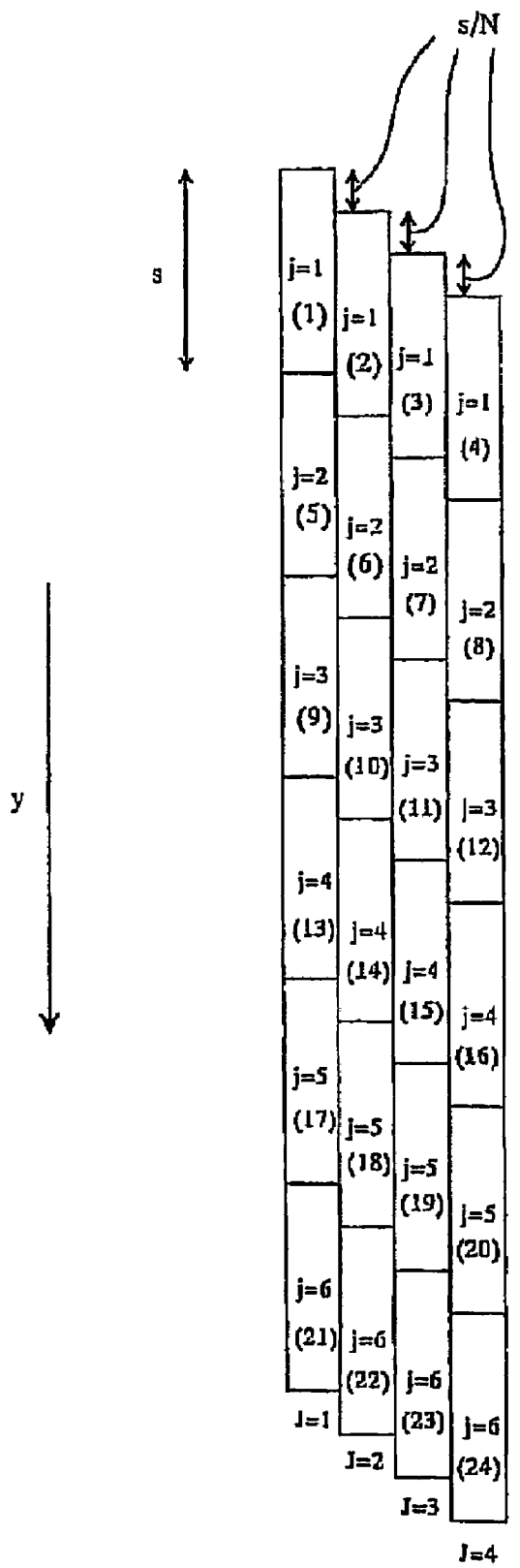
FIG. 11 is a figure showing a frame format of another pattern example of the rearranged (reconstructed) object image.

In accordance with the above structure, FIG. 10 indicates a frame format wherein the rearrangement of light detecting cells (3a), when the size of the reconfigured image obtained by rearranging light detecting cells (3a) is (m)×(n)×(s) (=(n)×(N)×(D)), is appeared, while FIG. 11 indicates another frame format wherein the rearrangement of light detecting cells (3a), when the size of the reconfigured image is (n)×(s), is appeared.

Thus, as shown in FIGS. 10 and 11, even if the relative position between micro-lens (1a) and light detecting cell (3a) becomes s/N=D/m (becomes the same in all units), a highly fine object image can be reconfigured according to the subject embodiment.

Finally, as referring to FIGS. 12 and 13, the embodiment wherein image input apparatus (A) achieves to take a color image will be explained below.

Figure 12:
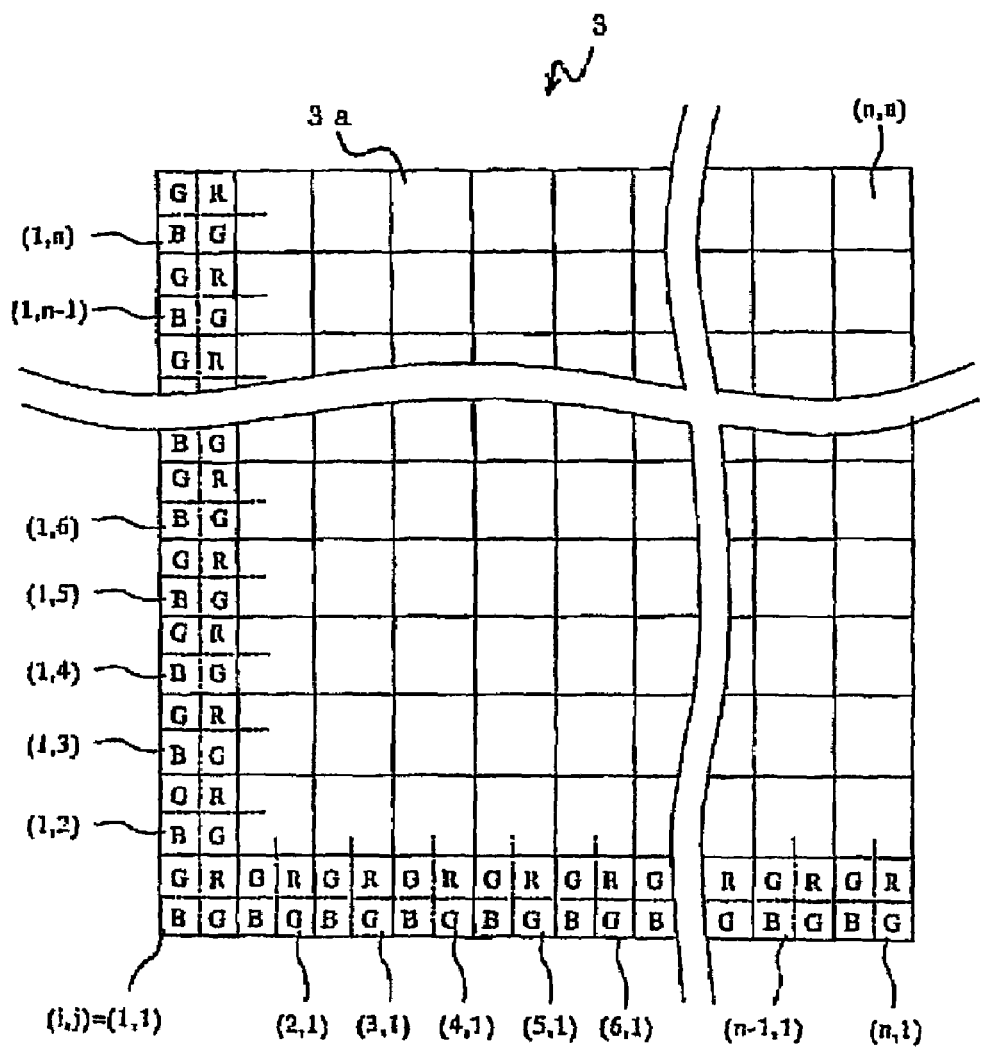
FIG. 12 is a figure showing an example of color filters arranged on the light detecting element.
Figure 13:
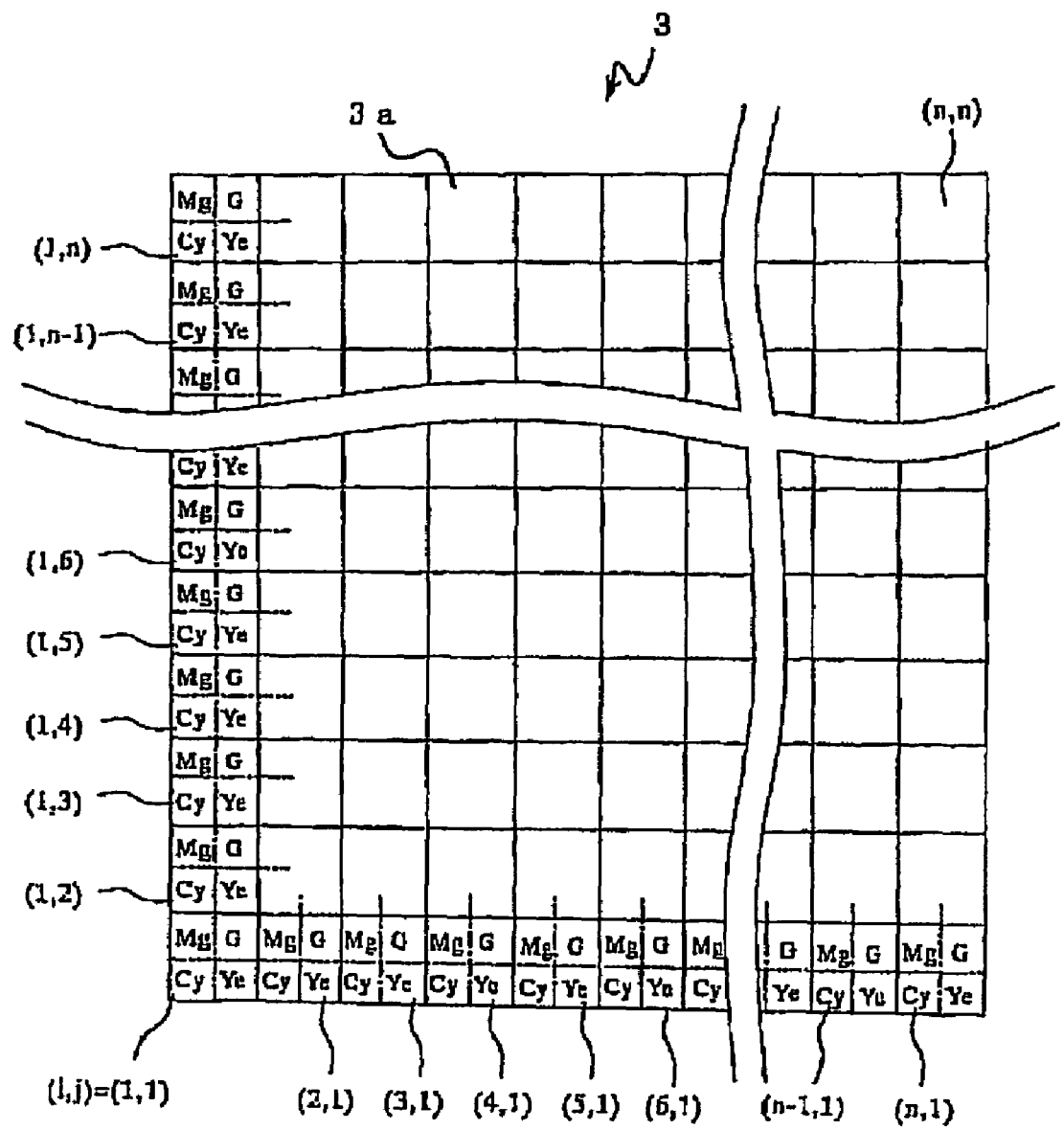
FIG. 13 is a figure showing another example of color filters arranged on the light detecting element.

FIGS. 12 and 13 are plain views of light detecting element (3) indicating the arrangement of light detecting cells (3*a*) per unit, and show the cases when arraying (n) number of light detecting cells (3*a*) both in the horizontal and the vertical directions.

Here, in order to achieve color images, it is characterized in the present embodiment that light detecting cells (3*a*) are divided into several regions (4 regions in the present embodiment), while the color filters are arranged in each of the divided regions.

Here, FIG. 12 indicates the case when primary color filters comprising Green(G), Red(R), and Blue(B) are applied. Color information, including the primary colors: green, red, and blue, can be obtained by, like foregoing embodiments, having micro-lens (1*a*) arranged to have different relative position with light detecting element (3) which has the above-mentioned dividing structure, and by providing prescribed signal processing to the object reduced images obtained per color.

In addition, regarding the array of the color filters, green that has highest human visibility is applied to a plurality of regions. Thus, signal-to-noise ratio of green signal is improved, thereby achieving improvement of the image quality.

On the other hand, FIG. 13 indicates the case when complementary color filters: Cyan(Cy), Yellow(Ye), Magenta(Mg), and Green(G) as four-color filter, are applied.

This case also achieves obtaining the color information of green and red and blue by providing prescribed signal processing, same as the primary color filters.

The relationship between Cyan(Cy), Yellow(Ye), Magenta(Mg), and Green(G) is;

$$(Cy)=(B)+(G)$$

$$(Ye)=(G)+(R)$$

$$(Mg)=(R)+(B)$$

Each colors: (R), (G) and (B) can be decided from the obtained image information of (Cy), (Ye) and (Mg) by calculation, and moreover, (G) can be calculated from light detecting cells (3*a*) comprising filter (G).

Firstly, the object image is reconfigured in regard to Cyan (Cy), Yellow(Ye), Magenta(Mg) and Green(G), from which the three primary colors, i.e. green, red and blue, is obtained by calculation.

Thus, the present embodiment finally enables colorizing of the final reconfigured image, and further, prevents increase of production cost for its simple structure of merely arranging the predetermined color filters to light detecting cells (3*a*).

As described above, the present invention can obtain the object reduced images differing in each unit even if the distance between the image input apparatus (A) and the subject is long (infinitely long, for example), and thereby achieving a high resolution, reconfigured image that is reconfigured based on those object reduced images.

Moreover, the colorization of the reconfigured image can be realized with the simple structure of providing the predetermined color filters to the light detecting cells formed within the light detecting element in the image input apparatus.

What is claimed is:

1. An image input apparatus comprising:
    a micro-lens array having a plurality of micro-lenses; and
    a light receiving element facing said micro-lens array;
    wherein a single object image of a subject is obtained by rearranging image information of a plurality of object reduced images focused on said light receiving element by said micro-lens array, and a relative position between a light axis of said micro-lens and a central axis of said light receiving element, on which said object reduced images are focused as responding to each one of said micro-lenses, is arrayed to sequentially increase by a certain quantity so that one end is smallest and the other end is largest relative to vertical and horizontal directions in an alignment of said micro-lens array.

2. An image input apparatus according to claim 1, wherein said certain quantity is s/N where:
    s is a pitch of said light receiving element in one of the vertical and horizontal direction in an alignment of said micro-lens array, and
    N is a number of said micro-lens units in the direction of said pitch of said light receiving elements.

3. An image input apparatus according to claim 1, wherein, in process of obtaining a single object image by rearranging said image information of a plurality of object reduced images focused on said prescribed region on said light receiving element per said micro-lens, rearranged positions on said object image, to where said image information of said object reduced images are rearranged, are determined on the basis of said relative position.

4. An image input apparatus according to claim 2, wherein, in process of obtaining a single object image by rearranging said image information of a plurality of object reduced images focused on said prescribed region on said light receiving element per said micro-lens, rearranged positions on said object image, to where said image information of said object reduced images are rearranged, are determined on the basis of said relative position.

\* \* \* \* \*